US007011898B2

(12) United States Patent
Butt et al.

(10) Patent No.: US 7,011,898 B2
(45) Date of Patent: Mar. 14, 2006

(54) METHOD OF JOINING ITM MATERIALS USING A PARTIALLY OR FULLY-TRANSIENT LIQUID PHASE

(75) Inventors: Darryl Paul Butt, Gainesville, FL (US); Raymond Ashton Cutler, Bountiful, UT (US); Steven Walton Rynders, Riverton, UT (US); Michael Francis Carolan, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 225 days.

(21) Appl. No.: 10/393,954

(22) Filed: Mar. 21, 2003

(65) Prior Publication Data

US 2004/0185236 A1 Sep. 23, 2004

(51) Int. Cl.
*B32B 9/00* (2006.01)
*C01B 13/00* (2006.01)

(52) U.S. Cl. .................... 428/701; 428/689; 428/697; 428/699; 428/700; 428/702; 423/593.1; 423/594.1; 423/594.16; 423/594.2; 423/594.5; 423/594.6; 423/604; 423/632; 423/635; 423/594.19

(58) Field of Classification Search ............ 428/689, 428/697, 699, 700, 701–702; 423/593.1, 423/594.1, 594.16, 594.2, 594.5, 594.6, 604, 423/632, 635, 594.19
See application file for complete search history.

(56) References Cited

OTHER PUBLICATIONS

S. D. Peteves et al., "The reactive route to ceramic joining: fabrication, interfacial chemistry and joint properties", Acta mater. vol. 46, No. 7, (1998), pp. 2407-2414.
Y. Iino, "Partial transient liquid-phase metals layer technique of ceramic metal bonding", J. of Mat. Sci. Lett. 10, (1991), pp. 104-106.
S. Serkowski, "Application of ceramic-metal eutectics for solid-state bonding between ceramics," Int. Symp. Ceram. Mater. Compon Engines, 4th (Roger Carlsson et al. eds.) (1992) pp. 348-355.
M. Neuhauser et al. "Fugen von Technischen Keramiken mit Keramik-Grunfolien," Ber. DGK, vol. 72, No. 1-2, (1995) pp. 17-20.
D. Seifert et al. "Verbind poroser mit dichtgesinterter $Al_2O_3$-Keramik durch Fugen mit keramischen Folien," Ber. DGK, vol. 73, No. 10 (1996) 585-589.
R. Chaim et al. "Joining of alumina ceramics using nanocrystalline tape cast interlayer," J. of Materials Research, 15, (2000) pp. 1724-1728.
Y. Zou et al., "Modelling of transient liquid phase bonding," Int. Mat. Rev. vol. 40, No. 5, (1995), p. 181.
I. Tuah-Poku et al., "Study of the Transient Liquid Phase Bonding, etc.," Metallurgical Transactions A vol. 19A, Mar. 1988, p. 675.
B. H. Rabin and G. A. Moore "Reaction Processing and Properties of SiC-to-SiC Joints", Material Res. Soc. Symp. Proc., vol. 314, (1993), pp. 197-203.

*Primary Examiner*—Ling Xu
(74) *Attorney, Agent, or Firm*—Keith D. Gourley (57) ABSTRACT

A method of forming a composite structure includes: (1) providing first and second sintered bodies containing first and second multicomponent metallic oxides having first and second identical crystal structures that are perovskitic or fluoritic; (2) providing a joint material containing at least one metal oxide: (a) containing (i) at least one metal of an identical IUPAC Group as at least one sintered body metal in one of the multicomponent metallic oxides, (ii) a first row D-Block transition metal not contained in the multicomponent metallic oxides, and/or (iii) a lanthanide not contained in the multicomponent metallic oxides; (b) free of metals contained in the multicomponent metallic oxides; (c) free of cations of boron, silicon, germanium, tin, lead, arsenic, antimony, phosphorus and tellurium; and (d) having a melting point below the sintering temperatures of the sintered bodies; and (3) heating to a joining temperature above the melting point and below the sintering temperatures.

8 Claims, 3 Drawing Sheets

METHOD OF JOINING ITM MATERIALS USING A PARTIALLY OR FULLY-TRANSIENT LIQUID PHASE

STATEMENT REGARDING FEDERALLY SPONSORED RESEARCH OR DEVELOPMENT

This invention was made at least in part with funding from the United States Department of Energy under program DE-FC-98FT40343. The United States Government has certain rights in this invention.

BACKGROUND OF THE INVENTION

The present invention relates to a method of forming a joint at an interface between two sintered bodies comprising multicomponent metallic oxides of specific crystal structure. When employing such sintered bodies in a device such as an oxygen separation device, it is often mandatory to join the same securely or even to provide a gas-tight joint, said joint being required to withstand operation conditions of the device. Typical sintered bodies in the above devices are an ion transport membrane (an electrolyte), an interconnect, a support, ceramic tubes, seals and conduits, etc. Such sintered bodies are typically joined tube-to-tube, tube-to-flat-plate and flat-plate to flat-plate, respectively.

Any joint is likely to form the weakest point of the entire device. Weak points are critical in cases where the device is subjected to severe operation conditions such as high temperature, high pressure differences or highly oxidizing or reducing environments which are tolerated by the sintered bodies themselves. To provide a commercially viable device, the joint is thus likewise required to maintain mechanical integrity, compatibility with the sintered bodies and gas-tightness even when subjected to the operating conditions. Accordingly an ideal joint would possess comparable chemical and mechanical properties as the materials to be joined, especially comparable thermal cycling stability.

Up to now, joints between sintered bodies have been formed by using metallic brazes, nanocrystalline oxides, oxide-metal eutectics, glasses and ceramic-glass composites. See, e.g., S. D. Peteves et al., "The reactive route to ceramic joining: fabrication, interfacial chemistry and joint properties", Acta mater. Vol. 46, No. 7, (1998), pp. 2407–2414; Y. Iino, "Partial transient liquid-phase metals layer technique of ceramic metal bonding", J. of Mat. Sci. Lett. 10, (1991), pp. 104–106; S. Serkowski, "Application of ceramic-metal eutectics for solid-state bonding between ceramics," Int. Symp. Ceram. Mater. Compon. Engines, $4^{th}$ (Roger Carlsson et al. eds.) (1992) pp. 348–355; M. Neuhauser et al."Fugen von Technischen Keramiken mit Keramik-Grunfolien," Ber. DGK, Vol. 72, No. 1–2, (1995) pp. 17–20; D. Seifert et al. "Verbind poroser mit dichtgesinterter $Al_2O_3$-Keramik durch Fugen mit keramischen Folien," Ber. DGK, Vol. 73 No. 10 (1996) 585–589; and R. Chaim et al. "Joining of alumina ceramics using nanocrystalline tape cast interlayer," J. of Materials Research, 15, (2000) pp. 1724–1728. Joining of sintered bodies using ceramic-metal eutectics has the disadvantage of requiring the use of a metal. Many metals oxidize in air at high temperatures and therefore require the use of special reducing atmospheres to prevent the formation of a metal oxide. The sintered bodies to be joined may not be stable in these reducing atmospheres, which would result in decomposition of the sintered bodies. Joining of sintered bodies using nanocrystalline interlayers has the disadvantage of requiring very high pressures that could damage the parts to be joined due to creep or even fracture.

The use of brazes, i.e., metallic materials, or glasses, i.e., solid solutions of multicomponent metallic oxides, has the disadvantage of leaving behind an interfacial phase of the joint material with properties differing from, and in most cases inferior to, those of the materials being joined. For example, brazes leave behind a ductile metal, which at elevated temperatures can creep, be incompatible with the surrounding ceramic materials, or oxidize. Similarly, glass joints may have significantly different thermal expansion coefficients compared with surrounding multicomponent metallic oxides having perovskitic or fluoritic structure, resulting in undesirable residual stresses following temperature changes. Glass joints will further soften and flow at temperatures above their respective glass transition temperature. Finally, glass joints can be chemically incompatible with a sintered body of perovskitic or fluoritic structure at elevated temperatures. In any case, due to the remaining material, the joint will inevitably be visually or microscopically detectable, its properties being determined by the material of the joint itself, not the bodies to be joined.

Another method of forming a joint is disclosed in B. H. Rabin, and G. A. Moore "Reaction processing and properties of SiC-to-SiC joints", Material. Res. Soc. Symp. Proc. 314, (1993), 197–203, Material Research Society, Pittsburgh. In this document it is disclosed that SiC components can be joined by using a mixture of Si and C powders. The document is silent on joining oxides in general, and especially on joining of multicomponent metallic oxides having fluoritic or perovskitic structure.

D. Seifert et al. "Verbind poroser mit dichtgesinterter $Al_2O_3$-Keramik durch Fugen mit keramischen Folien," Ber. DGK, Vol. 73 No. 10 (1996) 585–589, discloses a method to join alumina ceramics using ceramic joining foils of alumina-titania-calcia-magnesia. Other joining foils of alumina-titania-calcia-magnesia-silica and alumina-titania-manganese oxide-iron oxide-silica are also described. The joining temperature was greater than 100° K lower than the sintering temperature of the alumina ceramics to be joined. These joining compositions formed a liquid phase upon heating to the joining temperature. After joining, the joint retained the composition of the joining foils and was compositionally different than the alumina bodies that were joined. This reference states that the joining compositions to be used are highly specific to the ceramics to be joined. This reference is silent on how to join multicomponent metallic oxides. It is specifically silent on how to join perovskitic multicomponent oxides.

Another method to join alumina ceramics is disclosed in M. Neuhauser et al. "Fugen von Technischen Keramiken mit Keramik-Grunfolien," Ber. DGK, Vol. 72, No. 1–2, (1995) pp. 17–20. This method requires the use of ceramic foils made from a mixture of alumina, silica and other oxides. The presence of silica is undesirable since silica can be chemically or mechanically incompatible with the ceramics to be joined. In addition, this reference is also silent on how to join multicomponent metallic oxides.

A third method to join alumina parts using a $(Al,Cr)_2O_3$—Cr eutectic joining mixture is disclosed in S. Serkowski, "Application of ceramic-metal eutectics for solid-state bonding between ceramics," Int. Symp. Ceram. Mater. Compon. Engines, $4^{th}$ (Roger Carlsson et al. eds.) (1992) pp. 348–355. To obtain the joint, special gas atmospheres to produce extremely low oxygen partial pressures were required to allow the joining mixture to melt. The requirement of these special gas atmospheres limits the ceramics with which the eutectic mixtures can be used. Many ceramics will not be stable under the low oxygen partial pressure conditions needed for the eutectics to melt. Also the eutectic joining mixtures will result in the joint material being chemically and mechanically dissimilar to the bodies to be joined. This will have a negative effect of the stability and integrity of the joint. In addition, this reference is silent on joining multicomponent metallic oxides.

A fourth method to join alumina is disclosed in R. Chaim et al. "Joining of alumina ceramics using nanocrystalline tape cast interlayer," J. of Materials Research, 15, (2000) pp. 1724–1728. This method requires hot pressing the alumina parts to be joined under uniaxial pressures of 55–80 MPa at 1200–1300° C. This method has the alleged advantage that the joint material is chemically and mechanically identical to the parts to be joined. However, the high pressures necessary to produce the joint are undesirable since the high pressures can lead to fracture or creep of the ceramic parts to be joined. In addition, this reference is also silent on how to join multicomponent metallic oxides.

In metallurgy, another type of bonding has been developed recently which is the so-called transient liquid phase bonding (TLP). See, e.g., Y. Zou et al., "Modelling of transient liquid phase bonding", Int. Mat. Rev. Vol. 40, No. 5, (1995), p. 181, and I. Tuah-Poku et al., "Study of the Transient Liquid Phase Bonding, etc.", Metallurgical Transactions A Vol. 19A, March 1988, p. 675. This process relies on the transient formation of a liquid phase depending on solute diffusion. The bonding technology has exclusively been used on metallic bodies.

It is therefore desired to provide a method of forming a joint between a first sintered body comprising a first multicomponent metallic oxide having a crystal structure of the perovskitic or fluoritic type and a second sintered body comprising a second multicomponent metallic oxide having a crystal structure of the same type as the first multicomponent metallic oxide, which method allows for formation of a joint that is chemically and mechanically compatible with the first and second sintered bodies. It is further desired that the formation of the joint does not leave behind a distinguishable interfacial phase. It is still further desired that the method should further allow for forming a compatible, refractory interfacial phase or joint, especially a joint exhibiting comparable thermal cycling stability.

It is also desired to provide a method of forming a joint between the above first and second sintered bodies, wherein the joint has similar chemical and mechanical properties as the sintered bodies to be joined or where the joint, if present in form of an additional phase, may even have a similar chemical composition and similar crystal structure as the first and second sintered bodies.

All references cited herein are incorporated herein by reference in their entireties.

BRIEF SUMMARY OF THE INVENTION

Accordingly, the invention provides a method of joining at least two sintered bodies to form a composite structure, said method comprising:

providing a first sintered body comprising a first multicomponent metallic oxide having a first crystal structure selected from the group consisting of a perovskitic structure and a fluoritic structure;

providing a second sintered body comprising a second multicomponent metallic oxide having a second crystal structure identical to the first crystal structure;

providing at an interface between the first sintered body and the second sintered body a joint material comprising at least one metal oxide, wherein the at least one metal oxide:

(a) comprises (i) at least one metal of an identical Group of the IUPAC periodic table as at least one sintered body metal in one of the first multicomponent metallic oxide and the second multicomponent metallic oxide and/or (ii) a first row D-Block transition metal not contained in the first multicomponent metallic oxide and the second multicomponent metallic oxide and/or (iii) a lanthanide not contained in the first multicomponent metallic oxide and the second multicomponent metallic oxide;

(b) is free of metals contained in the first multicomponent metallic oxide and the second multicomponent metallic oxide;

(c) is free of boron, silicon, germanium, tin, lead, arsenic, antimony, phosphorus and tellurium; and (d) has a melting point below a first sintering temperature of the first sintered body and a second sintering temperature of the second sintered body; and heating the sintered bodies and the joint material to a joining temperature above the melting point and below the first and second sintering temperatures for a period of time sufficient to form a joint between the first sintered body and the second sintered body and thereby provide the composite structure.

In a preferred embodiment, a third multicomponent metallic oxide having a crystal structure of the same type as the first and the second multicomponent metallic oxide sintered bodies is formed at the interface.

The invention further relates to a composite structure comprising two sintered bodies as defined above joined by the method of the invention. Preferably such a device is a device for separating oxygen from a gaseous mixture containing oxygen.

DETAILED DESCRIPTION OF THE INVENTION

In a first aspect, the present invention relates to a method of forming a joint between a first sintered body comprising a first multicomponent metallic oxide having a crystal structure of the perovskitic or the fluorite type and a second sintered body comprising a second multicomponent metallic oxide having a crystal structure of the same type as the first multicomponent metallic oxide.

Similar technology is disclosed in two copending applications filed on even date herewith, one entitled "METHOD OF FORMING A JOINT", and having Ser. No. 10/393,564, and the other entitled "PLANAR CERAMIC MEMBRANE ASSEMBLY AND OXIDATION REACTOR SYSTEM", and having Ser. No. 10/394,620.

The above first and second sintered bodies are joined by (i) providing at the interface of the sintered bodies, where the joint is to be formed, a joint material comprising a metal oxide or mixture of metal oxides, (ii) heating the sintered bodies and the joint material, and (iii) holding at the heating temperature to react the metal oxide or mixture of metal oxides, or part thereof, to form the joint. Reaction may result in a third multicomponent metallic oxide having a crystal structure of the same type as the first and the second multicomponent metallic oxide being formed. Reaction may also result in formation of a joint without any noticeable phase being formed at the interface.

Upon heating in step (ii) a liquid phase is provided by the joint material. This liquid phase then reacts in step (iii) to form the joint, and may hence be called a transient liquid phase. The present invention thus relies on this transient liquid phase and sintering for formation of the joint. Transient liquid phase sintering has previously been used for densification of sintered materials, see, e.g., L. A. Chick et al., "Phase Transitions and Transient Liquid-Phase Sintering in Calcium-substituted Lanthanum Chromite", J. Am. Ceram. Soc. 80(8), (1997), pp. 2109–2120; R. N. Lumley and G. B. Schaffer, "The Effect of Solubility and Particle Size on Liquid Phase Sintering", Scripta Materialia Vol. 35, No. 5, (1996), pp. 589–595; and C. Hu and T. N. Baker, "An analysis of the capillary force and optimum liquid volume in a transient liquid phase sintering process", Materials Science and Engineering A190, (1995), pp. 125–129. Alumina has been joined using joint compounds that form liquid phases upon heating, see, e.g., S. Serkowski, "Application of ceramic-metal eutectics for solid-state bonding between ceramics," Int. Symp. Ceram. Mater. Compon. Engines, 4$^{th}$ (Roger Carlsson et al. eds.) (1992) pp. 348–355; M. Neuhauser et al."Fugen von Technischen Keramiken mit Keramik-Grunfolien," Ber. DGK, Vol. 72, No. 1–2, (1995) pp. 17–20; D. Seifert et al. "Verbind poroser mit dichtgesinterter Al2O3-Keramik durch Fugen mit keramischen Folien," Ber. DGK, Vol. 73 No. 10 (1996) 585–589. The method has, however, not been used for joining of multicomponent metallic oxides.

Upon heating in step (ii) a liquid phase and optionally at least one solid phase, preferably one or two solid phases are provided. Reaction of the liquid phase in step (iii) may be with the at least one solid phase or solid phases and/or with the first and/or second multicomponent metallic oxide. In the course of the reaction, a third multicomponent metallic oxide may be formed at the interface. Alternatively, especially when no solid phase is provided and/or reaction occurs with the first and second sintered body, no additional phase is formed at the interface.

The first and second sintered bodies to be joined by the method of the present invention comprise and preferably consist of a first and a second multicomponent metallic oxide, respectively. These multicomponent metallic oxides each have a crystal structure of the perovskitic or the fluorite type. Further, both the first and the second multicomponent metallic oxide have a crystal structure of the same type. With the expression "the same type," it is meant that in case of a first sintered body of perovskitic structure the second sintered body has perovskitic structure as well. In the case of a first sintered body of a fluorite structure, the second sintered body has a fluorite structure as well, and so on. Preferably they are of the same type of substructure, i.e., they are isostructural.

Perovskitic structures include as substructures true perovskites that incorporate a three-dimensional cubic array of octahedra, as well as structures that incorporate a perovskite-like layer or layers, i.e., a two-dimensional array of octahedra arranged in a two-dimensional square array. The octahedra consist of small diameter metal ions coordinated by six anions sites. These octahedra are charge stabilized by larger diameter metal ions. Examples of perovskitic structures include cubic perovskites, brownmillerites, Aurivillius phases and the like. Aurivillius phases, sometimes called lamellar perovskites, consist of layers of perovskite wherein the larger diameter metal cations have, in part or in total, been replaced by layers of another oxide, commonly $(Bi_2O_2)^{2+}$. Brownmillerites are perovskites that have one-sixth of the oxygen ions missing with the resulting oxygen ion vacancies ordered into continuous lines within the crystal. An example is $CaFeO_{2.5}$.

Fluorites are characterized by cation coordination numbers of 8 and anion coordination numbers of 4. The cations are arranged in a cubic close packed array in which the anions occupy tetrahedral sites between the cations. Examples of fluorites include yttria stabilized zirconia, stabilized bismuth oxide and doped ceria.

Preferably the first and the second multicomponent metallic oxides have common crystal lattice structures of a type selected from the group consisting of fluorite, brownmillerite, Aurivillius phases, and perovskite.

The first and second multicomponent metallic oxides of the first and second sintered body are not required to comprise the same metals. However, according to a preferred embodiment, the first and the second multicomponent metallic oxide comprise at least one, more preferably at least two identical metals. For example, the first multicomponent metallic oxide may belong to the lanthanum calcium iron cobaltite family, whereas the second multicomponent metallic oxide may belong to the lanthanum strontium cobaltite family. Both would be perovskites, i.e., multicomponent metallic oxides having a crystal structure of the same type (perovskite) identically comprising the two metals La and Co. Most preferably both sintered bodies are of the same material, i.e., comprise the same elements.

The joint material may comprise a single metal oxide, a mixture of metal oxides, a single multicomponent metallic oxide, a mixture of multicomponent metallic oxides or mixtures thereof as the metal oxide. In any case, the joint material forms a liquid phase, which liquid phase reacts to form the joint in step (iii). The mechanism by which the joint material forms the liquid phase includes any means of providing a liquid phase from the joint material, such as melting, phase segregation into a liquid and a solid phase and the like.

The metallic oxide or mixture of metallic oxides can be combined with conventional binders and/or solvents to provide an ink, paste or tape. This ink, paste or tape is then provided as the joint material at the interface.

Generally, the joint material used in the method of the invention:

(1) comprises at least one metal oxide including:
 (a) at least one metal of the same Group of the IUPAC periodic table as metal(s) contained in one of the first and the second multicomponent metallic oxides and/or
 (b) a first row D-Block transition metal not contained in the first and the second multicomponent metallic oxides and/or
 (c) a lanthanide not contained in the first and the second multicomponent metallic oxides;

(2) is free of metals contained in the first and the second multicomponent metallic oxides;

(3) is free of cations of the elements boron, silicon, germanium, tin, lead, arsenic, antimony, phosphorus and tellurium, (4) has a melting point below the sintering temperatures of both sintered bodies, and (5) optionally forms after heating and reacting a third multicomponent metallic oxide having a crystal structure of the same type as the first and the second multicomponent metallic oxide.

Preferably the joint material comprises: (a) at least one metal of the same group of the IUPAC periodic table as comprised in one of the first and the second multicomponent metallic oxides and (b) a first row D-Block transition metal not contained in the first and the second multicomponent metallic oxide and/or (c) a lanthanide not contained in the first and the second multicomponent metallic oxide.

If present, the third multicomponent metallic oxide formed from the metal oxide as the joint material may also comprise a mixture of metals contained in the first multicomponent metallic oxide, and/or in the second multicomponent metallic oxide and in the metal oxide.

In certain embodiments, the joint material comprises a material selected from the group consisting of magnesium oxide, calcium oxide, barium oxide, strontium oxide, copper oxide and mixed oxides and mixtures thereof.

The metal oxide of the joint material is substantially, and more preferably, completely free of cations of the glass forming elements boron, silicon, germanium, tin, lead, arsenic, antimony, phosphorus and tellurium. Metallic oxides comprising these elements are not suitable as joint materials for the method of the invention, since they tend to form solid solutions (glasses) instead of multicomponent metallic oxides having a defined crystal structure. Typical examples of such components are the glass seals used in prior art.

The joint material has a melting point and hence melts below the sintering temperatures of both sintered bodies. The term "melting point" refers to a temperature at which the joint material provides a liquid phase. This can, e.g., be by melting one or more or all of the metal oxide components of the joint material, by phase segregation from the metal oxide(s) or a mixture of both processes. The term does not require all of the joint material to be in liquid state above the melting point, but includes forming a liquid phase and at least one solid phase.

Since formation of the joint should typically not deteriorate structural integrity of the bodies to be joined, joining is carried out at temperatures below the sintering temperature of the sintered bodies. The term "sintering temperature" as used herein, refers to a temperature at which the density of the sintered bodies starts changing appreciably. Sintering temperatures of various ceramic compositions are known to the skilled worker and/or can be determined by routine measurements. Typical sintering temperatures for an exemplary perovskite such as lanthanum strontium cobaltites are in the range of 1150° C. to 1300° C., and especially 1200° C. to 1250° C. The melting point of the joint material must be sufficiently below these sintering temperatures to allow for heating the sintered bodies and the joint material to a temperature above said melting point of the joint material and below the sintering temperature of the first and the second sintered body. Typically, the melting point of the joint material is at least 50° C., preferably at least about 100° C. and even more preferably about 200° C. lower than the lowest of the sintering temperatures of the first and the second sintered body, respectively.

During heating and/or holding in steps (ii) and (iii), respectively, a pressure is optionally applied to the sintered bodies to be joined to promote joint formation. Generally such pressure may be in the range of up to 1 MPa. Preferably such pressure will be in the range of 1–500 kPa. In certain embodiments, the method is conducted under no applied pressure, or at another pressure insufficient to damage the sintered bodies and the joint.

Upon heating, the liquid phase is provided in a quantity sufficient to wet the surface of any remaining solid phase(s) of the joint material and/or the two surfaces of the sintered bodies. Preferably sufficient liquid phase is formed to fully wet the entire interface where the joint is to be formed. Insufficient wetting will result in an inferior joint. Hence, by testing joint quality (e.g., gas tightness, porosity, fracture strength etc.), the necessary amount of liquid can be determined by the skilled worker. The liquid phase then reacts with any remaining solid phase(s) of the joint material and/or the first and/or second multicomponent metallic oxide of the first and second sintered body, respectively. During the reaction a third multicomponent metallic oxide may be formed at the interface. This is especially advantageous in the case of uneven surfaces, since formation of the third multicomponent metallic oxide allows for filling of voids during joining. Formation of such third oxide is, however, not mandatory. As the reaction proceeds, the liquid phase is consumed and finally vanishes.

Figure 1:
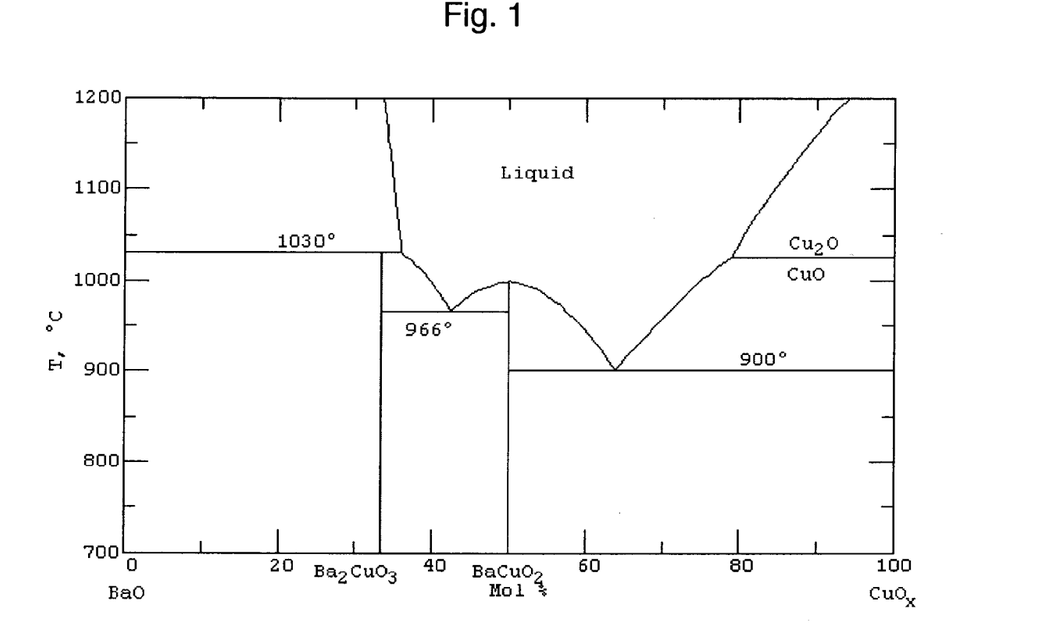
FIG. 1 is a phase diagram of the system BaO—CaO.

The sufficient amount of liquid phase is typically obtained by choosing a low melting point composition within a phase diagram of the oxides contained in the joint material. Suitable compositions and phase diagrams can be easily determined by the skilled worker taking into account size, valences and co-ordination of the respective metal cations of the joint material's metal oxide(s) and the sintered bodies. The low melting point composition can be used as such or can be admixed with another more refractory compound or mixture of compounds to give the joint material which provides the desired amount of liquid and solid phase. Exemplary phase diagrams are shown in appending FIGS. 1 and 2, which were taken from Lee and Lee, J. Am. Ceram. Soc., 72 [2] p. 314–319, 1989, and A. M. M. Gadalla et al., Trans. Br. Ceram. Soc., 62 [4] p. 181–190, 1966, respectively.

The joint material is formed by mixing the respective metal oxides in the desired quantities according to known ceramic procedures, optionally adding binder and plasticizers known in the art.

Heating conditions and powder compositions are preferably selected such that the joint becomes completely solid at the heat treatment temperature. Heating is preferably carried out in conventional equipment used for sintering and up to the above temperature range. After heating, the sintered bodies are held in step (iii) at the temperature for a sufficient time to allow for formation of the joint and especially to allow for the liquid phase to be consumed. Suitable holding times can be determined depending on the composition, the size of the interface and the volume of liquid phase as well as the speed of the reaction. Typical holding times are in the range of about 5 minutes to about 24 hours, preferably 1 to 4 hours. Heating can be conducted in a variety of atmospheres, and is preferably conducted in an atmosphere, such as air, that is not harmful to the sintered bodies. Reducing and/or oxidizing atmospheres are not required as in certain prior art methods.

In a preferred embodiment of the method of the invention the first and the second multicomponent metallic oxide have perovskitic structure. More preferably the first and second multicomponent metallic oxide are the same or different and are independently represented by $$A_x A'_{x'} A''_{x''} B_y B'_{y'} B''_{y''} O_{3-\delta}$$

wherein A is an F-Block lanthanide, La or a mixture thereof; A' is a group 2 metal; A" is selected from Groups 1, 2 and 3 of the periodic table and the F-Block lanthanides; B, B' and B" are different from each other and are independently selected from the D-Block transition metals, preferably the first row D-Block transition metals; δ is a number which renders the composition charge neutral; and wherein $0 \leq x \leq 1$; $0 \leq x' \leq 1$; $0 \leq x'' \leq 1$; $0 \leq y \leq 1.1$; $0 \leq y' \leq 1$; and $0 \leq y'' \leq 1$, provided that $(x+x'+x'')=1$ and $0.9 \leq (y+y'+y'') \leq 1.1$.

More preferably in the first and second multicomponent metallic oxides at least two of A, A', A", B, B', and B" are the same and their respective indices x, x', x", y, y', and y" meet the following conditions: $|(x_1-x_2)|$: $x_1 \leq 0.1$ (i.e., the absolute value of the difference between index "x" of the first multicomponent metallic oxide (i.e., $x_1$) and index "x" of the second multicomponent metallic oxide (i.e., $x_2$) divided by $x_1$ is less than or equal to 0.1); $|(x_1'-x_2')|$: $x_1' \leq 0.1$; $|(x_1''-x_2'')|$: $x_1'' \leq 0.1$; $|(y_1-y_2)|$: $y_1 \leq 0.1$; $|(y_1'-y_2')|$: $y_1' \leq 0.1$; and $|(y_1''-y_2'')|$: $y_1'' \leq 0.1$.

In a most preferred embodiment the first and second multicomponent metallic oxides are independently represented by the formula $$La_x Sr_{x'} Co_y Fe_{y'} O_{3-\delta}$$

wherein $(x+x')=1$; $0 \leq y \leq 1.05$; $0 \leq y'' \leq 1.0$, and $0.95 \leq (y+y'') \leq 1.05$. In this case, the at least one metal oxide of the joint material is preferably selected from the group consisting of copper oxide, barium oxide, lanthanum oxide, cobalt oxide, calcium oxide, and mixtures and mixed oxides thereof, with copper oxide and calcium oxide and mixtures and mixed oxides thereof, such as $Ca_2CuO_3$, being especially preferred.

In a second aspect the invention relates to a composite structure comprising two of the sintered bodies as defined above, joined by the method of the invention. The joint may be formed at an interface between two flat surfaces, but may also be formed along curved and/or non-even surfaces, such as outer surfaces of the cylindrical body of a tube, etc. Preferably, the joint is hermetic to helium. It is also preferable that the composite structure be free of an interfacial phase, or less preferably, contain an interfacial phase at least as resistant to oxidation and reduction as the first sintered body and the second sintered body.

Preferably, the composite structure is a device for separating oxygen from an oxygen containing gaseous mixture and optionally the device is also for reacting said oxygen. Such devices are known in the art and are, e.g., described in U.S. Pat. Nos. 5,240,480, 5,534,471, and 5,681,373, and European Patent Application 1035072. Typically the sintered bodies in these cases are selected from the group consisting of an ion transport membrane, an electrolyte, an interconnect, a ceramic tube, a support, and seals. These are in general joined tube-to-tube, tube-to-flat-plate or flat-plate-to-flat-plate, respectively, including butt-to-butt, circumference-to-butt and circumference-to-circumference joints.

The invention shall be further illustrated and the objects and advantages thereof will be more clearly understood by reference to the following examples, which are given for illustration purposes only and are not intended to limit the scope of the invention.

EXAMPLES

Examples 1–2

Joining of $La_{0.4}Sr_{0.6}CoO_{3-\delta}$—Disks and Tubes

The batches of joint material shown in Table 1 were prepared by paint shaking the raw materials for one hour in a 250 ml polyethylene jar with 100 g of 2-propanol and 250 g of spherical Y-TZP media. The slurries were dried and then dry milled for 30 minutes before screening −20 mesh. The powders were calcined by heating at 100° C./hr to 900° C. and holding for 10 hours, before cooling to room temperature at 100° C./hr. The calcined powders were screened −40 mesh using an alumina pestle before making slips by adding 0.5 g polyvinyl butyral (PVB) as a dispersant to 38.0 g toluene and 9.5 g ethanol. One hundred grams of the calcined powders were added together with 250 g Y-TZP media to a 250 ml polyethylene jar. Slips were put on the paint shaker for one hour. Binder (7.25 g PVB) and plasticizer (3.88 g butyl benzyl phthalate (BBP)) were added to make the slips approximately 60 vol. % solids. The binder was dissolved by paint shaking for 90 minutes. The slips were degassed and cast on silicone-coated polyester at a doctor blade height of 0.13 mm to give dried tapes between 40 and 50 µm thick.

TABLE 1

| | Compositions for joining | | | |
|---|---|---|---|---|
| | | | Mass | |
| Example | Composition (Mol %) | CuO[1] | BaCO$_2$[2] | CaCO$_2$[3] |
| 1 | 48% BaO—52% CuO | 82.73 | 189.45 | — |
| 2 | 15% CaO—85% CuO | 135.23 | — | 30.03 |

[1]Baker grade 1814-05 (lot K29157).
[2]Kali-Chemie Corp. grade VL 700 (high purity).
[3]GE grade 111-30-26 (lot PL-1775).

Disks and tubes of $La_{0.4}Sr_{0.6}CoO_{3-\square}$ were sintered at 1250° C. for 2 hours and then ground flat on a 20 µm diamond wheel. The ground disks ranged in thickness between 600 and 1000 µm and were approximately 22 mm in diameter. Tape (25 mm in diameter) of each composition in Table 1 was sandwiched between two ground disks or between a tube and a disk. Weights of mass 37.5 g were placed on parallel sets of sandwiched parts to keep the tape in contact with the disks/tubes during binder removal. The sets were heated at 20° C./hr to 150° C., 10° C./hr 150–300° C., 50° C./hr 300–1100° C. (4 hour hold at 1100° C.), and then cooled at 50° C./hr to room temperature.

For joining disks to tubes a tape (19 mm in diameter) was placed on top of a ground disk and the tube section was placed upon it. The ground tubes had an open diameter of 15.5 mm and an internal diameter of 11.5 mm. Weights of mass 811 g or 512 g were placed on two of the tubes. A third assembly had no weight. The three tubes were fired by heating at 20° C./hr to 150° C., 10° C./hr 150–300° C., 50° C. /hr 300–1100° C. (4 hour hold at 1100° C.), 50° C./hr 1100–400° C. (10 hr hold at 400° C.), and then cooling at 50° C./hr to room temperature.

The tubes and disks were considered as bonded when adhering to each other at room temperature under slight mechanical stress as applied, e.g., by handling the joined parts or by polishing. Bonded tube sections were further leak-checked at room temperature to test quality of the bond. The joints were tested in conventional manner for gas tightness with helium. The tests revealed in many cases (see following examples) that hermetic joints had been formed.

Energy Dispersive Spectroscopy (EDS) was used to examine chemical homogeneity. EDS mapping showed that the Cu and Ca diffused away from the interface during a four-hour hold at 1100° C., presumably allowing solidification at that temperature. The joints were further inspected visually, microscopically and by back-scattered secondary electron microscopy (SEM) images (fractured and polished samples). At each time it appeared that the joints were hardly recognizable and in some cases virtually disappeared in lower magnification.

powders were X-rayed using Cu $K_{alpha}$ radition. As expected, all compositions (except Example No. 3) consisted of a mixture of CuO and $Ca_2CuO_3$ after calcination at 900° C.

TABLE 3

Composition of Inks

| Ex. and Comp. No. | Composition (mole %) after Sintering | Amount (g) | □-Terpineol (g) | V-006* (g) | Oleic acid (g) | Viscosity (Pa s) |
| --- | --- | --- | --- | --- | --- | --- |
| 3 | CuO | 124.6 | 40.0 | 17.0 | 1.0 | 337 |
| 4 | CuO—15% $Ca_2CuO_3$ | 121.0 | 35.0 | 17.0 | 1.0 | 3 |
| 5 | CuO—22% $Ca_2CuO_3$ | 118.9 | 32.5 | 17.0 | 1.0 | 20 |
| 6 | CuO—30% $Ca_2CuO_3$ | 116.8 | 27.5 | 17.0 | 1.0 | 34 |
| 7 | CuO—45% $Ca_2CuO_3$ | 112.5 | 25.5 | 17.0 | 1.0 | 64 |
| 8 | CuO—60% $Ca_2CuO_3$ | 108.3 | 24.0 | 17.0 | 1.0 | 98 |
| 9 | CuO—75% $Ca_2CuO_3$ | 104.1 | 24.0 | 7.0 | 1.0 | 118 |
| 10 | CuO—90% $Ca_2CuO_3$ | 104.1 | 24.0 | 17.0 | 1.0 | 118 |

*Heraeus, Inc., Cermalloy Div.

Examples 3–10

Preparation of Inks

Figure 2:
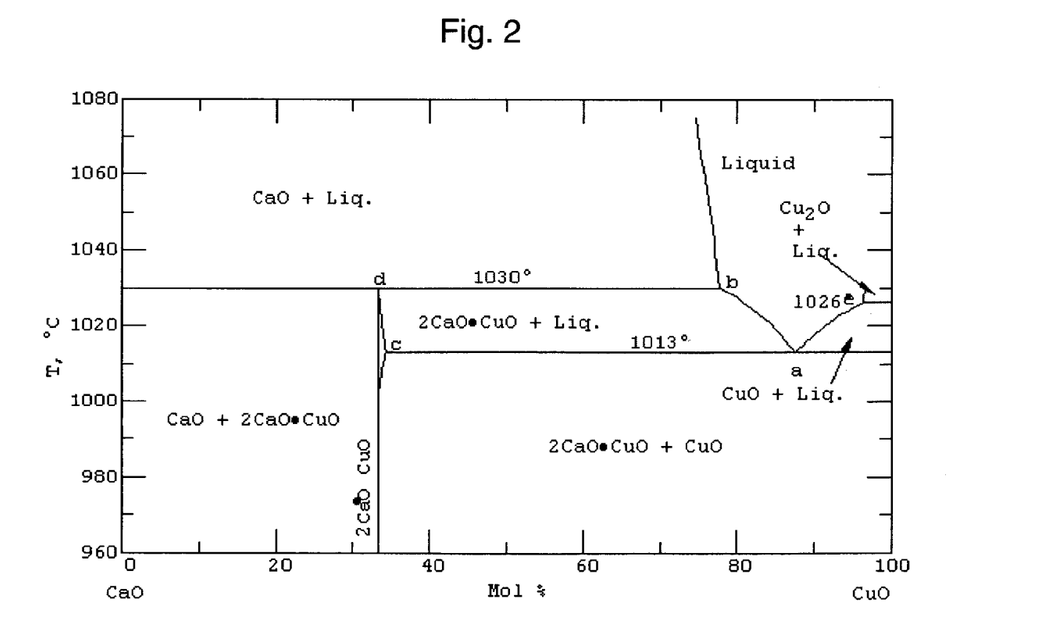
FIG. 2 is a phase diagram of the system CaO—CuO.

To illustrate a full range of compositions 8 inks were prepared from the compositions shown in Table 2, i.e., for pure CuO and mixtures of copper and calcium oxides. FIG. 2 shows the phase diagram for Cu and Ca in air, indicating that all of the compositions should have some portion of a molten phase above 1026° C. Example 5, i.e., the eutectic composition, will form a liquid at the lowest temperature and Example 10 will have the least amount of a liquid phase at all temperatures.

TABLE 2

Compositions Prior to Calcination

| | | Mass (g) | |
| --- | --- | --- | --- |
| Composition No. | Composition | CuO | $CaCO_3$ |
| 3 | CuO | 200 | 0.0 |
| 4 | CuO—0.1$CaCO_3$ | 175.5 | 24.53 |
| 5 | CuO—0.15$CaCO_3$ | 163.7 | 36.34 |
| 6 | CuO—0.2$CaCO_3$ | 152.1 | 47.86 |
| 7 | CuO—0.3$CaCO_3$ | 129.9 | 70.06 |
| 8 | CuO—0.4$CaCO_3$ | 108.8 | 91.23 |
| 9 | CuO—0.5$CaCO_3$ | 88.56 | 111.4 |
| 10 | CuO—0.6$CaCO_3$ | 69.27 | 130.7 |

All 8 powders were put on the paint shaker for one hour in 250 ml high density polyethylene jars with 250 g Y-TZP spherical media and 100 g isopropanol. The mixed powders were then air-dried overnight before oven drying at 70° C. for three hours. The dried powders were dry milled for 30 minutes before screening –40 mesh. The powders, with the exception of the CuO (Example No. 3), were then calcined at 900° C. for 10 hours with 100° C./hr ramps. The calcined powders ranged in surface area between 0.2 $m^2$/g and 0.5 $m^2$/g. They were vibratory milled for 48 hours with 80 g 2-propanol and 500 g of spherical Y-TZP in 250 ml high density polyethylene jars. The surface areas of the milled powders ranged between 2 and 7 $m^2$/g. The milled powders were dried overnight and then made into inks by adding □-terpineol, V-006, and oleic acid in the amounts given in Table 3, using the three-roll mill. The rear rollers had a 50 $\mu$m opening and the front rollers had an opening of 25 $\mu$m. All inks were put through the rollers four times and then turned slowly to keep the inks in suspension.

Examples 11–15

Joining of Parts

Ground $La_{0.4}Sr_{0.6}CoO_{3-\square}$ (LSCo) tubes were joined to ground LSCo disks, with Inks 3 to 10 from Examples 3 to 10 dispensed on the tube and then the tube was placed on the disk and twisted to force the ink out, as tube-to-disk contact was made. The inks were dried using warm, flowing air.

Eighteen tubes were joined to eighteen disks at a pressure of approximately 10 kPa by heating to 1250° C. for one hour using the following heating/cooling profile: RT-1250° C. at 50° C. hr (1 hour hold at 1250° C.), 1250–700° C. at 50° C./hr, 700–650° C. at 25° C./hr, 650–600 at 17° C./hr, 600–550° C. at 10° C./hr, 550–500° C. at 5° C./hr, 500–450° C. at 2.5° C./hr, 450–400° C. at 2° C./hr, 400–20° C. at 50° C./hr. The tubes were leak-checked after sealing. Selected samples were polished with diamond paste or fractured before viewing with the SEM. The polished tube sections were re-checked with the leak-rate meter to determine bond quality.

All of the tube/disk assemblies appeared to be well bonded. Leak checking showed that they were nearly hermetic at room temperature. Polishing causes mild mechanical stresses, which may increase the leak rate. The results are given in Table 4. These results show that a wide range of CaO—CuO compositions can be used for joining at 1250° C. This is consistent with the phase diagram given in FIG. 2, which shows a liquid phase above 1030° C. The liquid phase is transient, as CuO diffuses into/reacts with the perovskite.

TABLE 4

Room Temperature Leak Rates
After Joining at 1250° C. for One Hour

| Ex. | Comp. No. | Leak Rate (sccm) Before Polishing | After Polishing |
|---|---|---|---|
| 11 | 3 | 0.22, 0.23 | 4.2 |
| 12 | 5 | 0.006, 0.007 | 0.09 |
| 13 | 7 | 0.002, 0.007 | 0.01 |
| 14 | 9 | 0.001, 0.004 | 0.004 |
| 15 | 10 | 0.008, 0.0008 | 0.59 |

Examples 16–23

Amount of Joint Material

Inks prepared in Examples 3–10 were used to join tubes and disks with the procedure given in Examples 11–15, but using varying screens for printing, which resulted in varying amounts of ink provided at the interface. Tube/disk assemblies were joined at a pressure of approximately 10 kPa by heating to temperature for one hour in a furnace using the following heating/cooling profile: RT-1250° C. at 50° C. hr (1 hour hold at 1250° C), 1250° C.–700° C. at 50° C./hr, 700–600° C. at 25° C./hr, 600–500 at 10° C./hr, 500–400° C. at 5° C./hr, 400–20° C. at 50° C./hr.

Table 5 gives the leak-rate data for ink compositions CuO (Example No. 3), CuO-15 mol. % CaO (Example No. 5), CuO-40 mol. % CaO (Example No. 7), and CaO-60 mol. % CuO (Example No. 8). It was possible to make hermetic joints for all compositions using a mixed oxide as a binder.

TABLE 5

Leak Rate Data for Tube/Disk Assemblies from Examples 15–18

| Example | Ink Composition | Mesh/Wire Diameter | Ink No. Applied (g/cm$^2$) | Leak Rate (sccm) | Hermetic[a] |
|---|---|---|---|---|---|
| 16 | 3 | 109/80 | $9.3 \pm 0.5 \times 10^{-3}$ | $0.45 \pm 0.7$ | 0 out of 3 |
| 17 | 3 | 200/55 | $5.8 \pm 0.5 \times 10^{-3}$ | 0.0 | 3 out of 3 |
| 18 | 5 | 109/80 | $9.7 \pm 0.9 \times 10^{-3}$ | $1.7 \pm 3.1$ | 1 out of 3 |
| 19 | 5 | 200/55 | $6.9 \pm 0.2 \times 10^{-3}$ | 0.0 | 3 out of 3 |
| 20 | 7 | 109/80 | $9.9 \pm 1.0 \times 10^{-3}$ | 0.0 | 3 out of 3 |
| 21 | 8 | 109/80 | $7.9 \pm 0.7 \times 10^{-3}$ | 0.0 | 3 out of 3 |
| 22 | 8 | 325 | $5.3 \pm 0.2 \times 10^{-3}$ | 0.0 | 3 out of 3 |
| 23 | 8 | 109/80 | $9.6 \pm 0.6 \times 10^{-3}$ | 0.0 | 3 out of 3 |

[a]Hermetic to He at room temperature.

Hermeticity is only one measure of whether joints are acceptable. Examination using SEM showed that the best joints were made with the least Cu, such that the CuO-60 mol. % CaO was superior to the other three compositions. The stress involved in grinding and polishing reveals a damage zone due to the CoO to $Co_3O_4$ transition that produces intergranular fracture and pullout in this region due to the tensile stress in the LSCo matrix. Spontaneous spalling from the surface, without any grinding, was noted for inks with high copper concentrations (Examples 16 and 18) due to this same effect. Annealing above the CoO<->$Co_3O_4$ transition temperature limited the effect, but did not eliminate it.

Figure 3A:
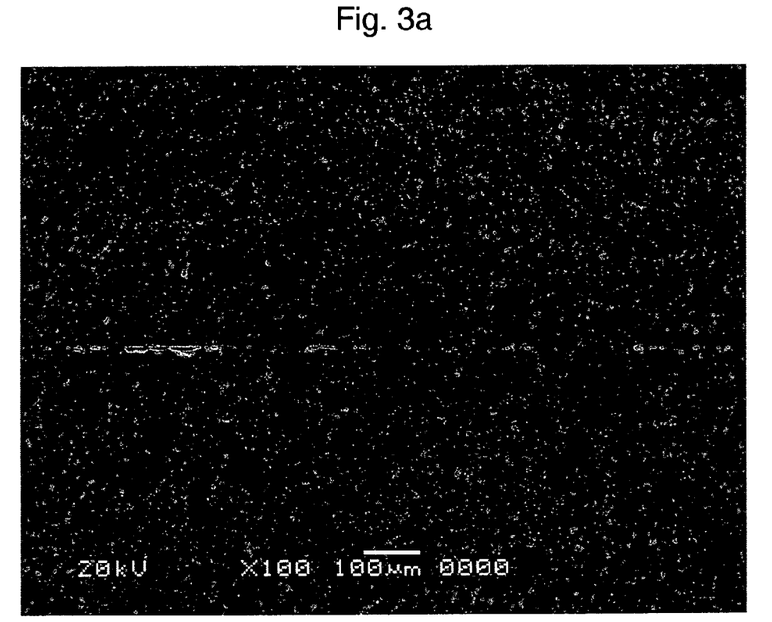
FIGS. 3a, 3b, 3c and 3d are cross-sections of a $La_{0.4}Sr_{0.6}CoO_3$ disk (top) bonded to a tube of the same material (bottom) using CuO-60 mole % CaO at 1250° C. for one hour with 325 mesh stainless steel screen used for printing (FIGS. 3a and 3b) and 109 mesh screen for printing (FIGS. 3c and 3d), wherein 3a is a polished cross-section; 3b is a fractured cross-section; 3c is a polished cross-section; and 3d is a fractured cross-section.
Figure 3B:
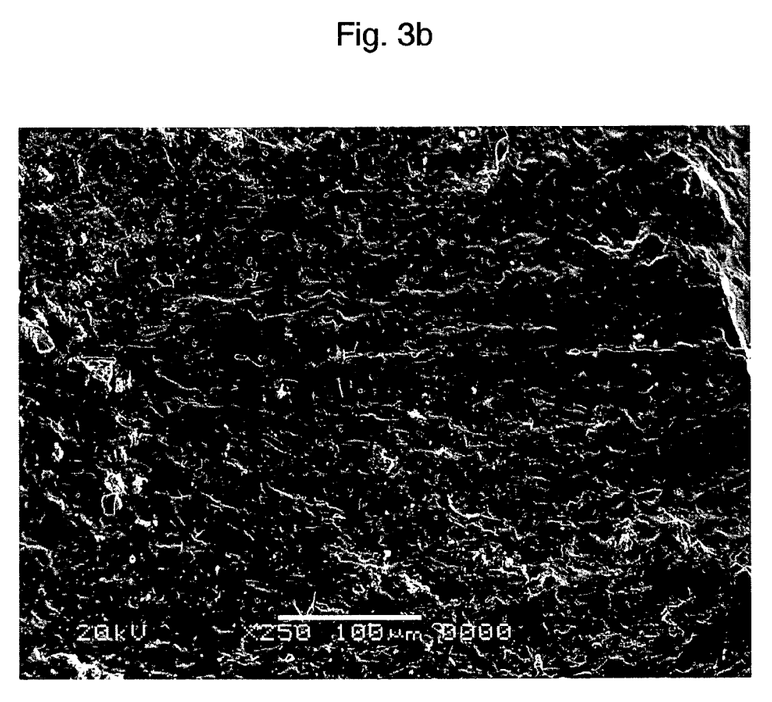
Figure 3C:
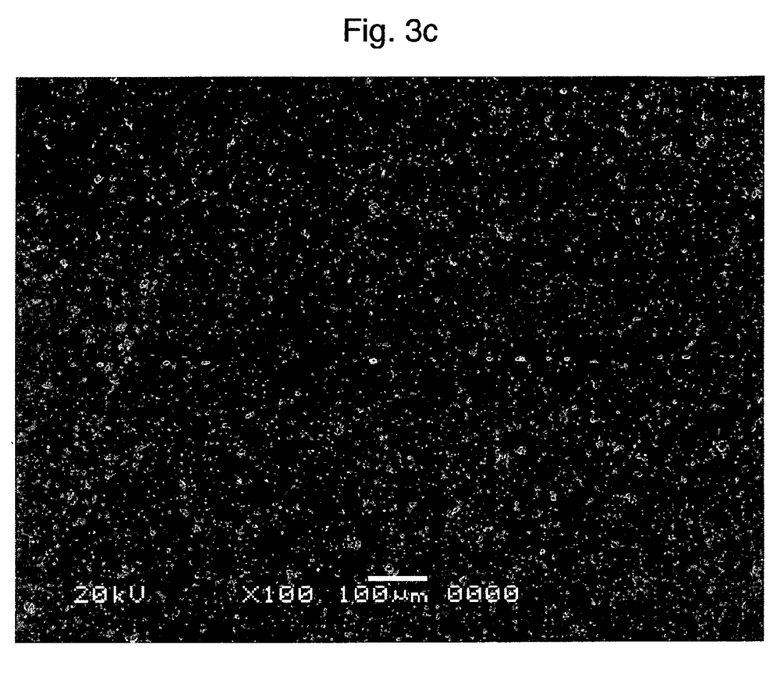
Figure 3D:
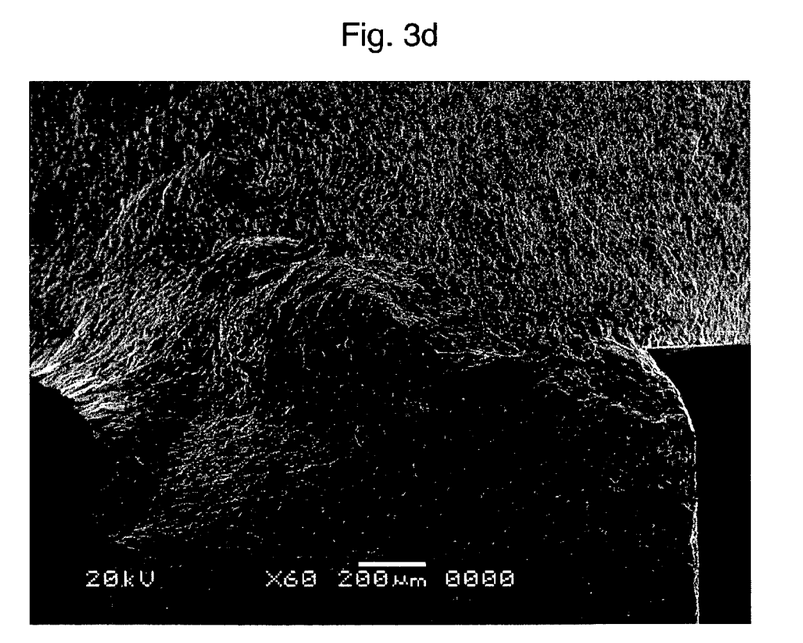

Eighteen out of eighteen joints made with the CaO-40 mol. % CuO composition (Example No. 8) have been hermetic to He at room temperature when joined by hand with a small twisting motion to insure intimate contact. Example 22 shows a repeat of Example 21, with slightly less ink and the joint is clearly visible (see FIGS. 3a and 3b). When more ink was used (see Example 23 and FIGS. 3c and 3d) the joint is barely visible. Tube/disk assemblies have been cycled above 1100° C. and remained hermetic after cycling.

Examples 24–29

Effectiveness of Other Joint Materials

Four different tapes were used to join sintered LSCO tubes (6.35 g/cc)) and ground rims to disks. The tapes were CuO-15 mol. % CaO (No. 2), $Ca_{1.01}FeO_{2.5}$, $Fe_2O_{3-26}$ wt. % CaO and $Fe_2O_{3-23}$ wt. % CaO. All four compositions form transient liquid phases before 1250° C. All tapes were approximately 50 µm thick. Heating rates were 50° C./hr to the joining temperature. All of the assemblies were joined together. Table 6 displays which of the assemblies were hermetic.

Nine samples of the LSCo sintered bodies were joined using CuO-15 mol. % CaO tape and ink. Six of these samples were of tube-to-tube geometry (butt to butt), ink was applied to three of these and tape was used on the other three. The remaining three samples consisted of tape between a rim and a disk. SEM analysis of the sintered samples revealed that the $Ca_2CuO_3$—CuO composition flows well and wets the surfaces that it is in contact with. Heating to 1250° C. for two hours leaves a third phase or third multicomponent metallic oxide at the interface of the tube-to-tube samples. This third phase fills any voids at the interface leaving a few pores only. The composition of this third phase is mainly calcium, iron, and oxygen with small amounts of copper remaining. The third phase diffused away after annealing at 1425° C. for 4 hours. All joints were hermetic to He at room temperature.

TABLE 6

Joining with Different Liquid Phases

| | | Joining Parameters | | |
|---|---|---|---|---|
| Example | Tape composition | Pressure (kPa) | Temp./Time | Hermetic |
| 24 | CuO—15 mol. % CaO | 0 | 1250° C./1 hour | 3 out of 3 |
| 25 | CuO—15 mol. % CaO | 3 | 1250° C./1 hour | 3 out of 3 |
| 26 | CuO—15 mol. % CaO | 90 | 1250° C./1 hour | 3 out of 3 |
| 27 | $Ca_{1.01}FeO_{2.5}$ | 2 | 1425° C./ 18 hours | 0 out of 3 |
| 28 | $Fe_2O_3$—50 mol. | 0–2 | 1425° C./ | 1 out of 4 |

TABLE 6-continued

Joining with Different Liquid Phases

| | | Joining Parameters | | |
|---|---|---|---|---|
| Example | Tape composition | Pressure (kPa) | Temp./Time | Hermetic |
| 29 | % CaO Fe$_2$O$_3$—46 mol. % CaO | 0–2 | 18 hours 1425° C./ 18 hours | 1 out of 4 |

According to the method of the invention, as is evidenced by the above examples, it is possible to join sintered bodies such as ceramic tubes to disks by using a transient liquid phase.

While the invention has been described in detail and with reference to specific examples thereof, it will be apparent to one skilled in the art that various changes and modifications can be made therein without departing from the spirit and scope thereof.

We claim:

1. A composite structure comprising:
 a first sintered body comprising a first multicomponent metallic oxide having a first crystal structure selected from the group consisting of a perovskitic structure and a fluoritic structure,
 a second sintered body comprising a second multicomponent metallic oxide having a second crystal structure identical to the first crystal structure, and
 a joint between the first sintered body and the second sintered body comprising at least one metal oxide, wherein the at least one metal oxide comprises:
 (a) at least one metal of the same group of the IUPAC periodic table as comprised in one of the first and the second multicomponent metallic oxides and
 (b) a first row D-Block transition metal not contained in the first and the second multi-component metallic oxide and/or
 (c) a lanthanide not contained in the first and the second multicomponent metallic oxide.

2. The composite structure of claim 1, wherein the first and second crystal structures consist of one member selected from the group consisting of a perovskitic structure and a fluoritic structure.

3. The composite structure of claim 1, wherein the first and second sintered bodies are tubes and/or flat plates and the joint is a tube-to-tube, a flat-plate-to-tube or a flat-plate to flat-plate joint.

4. The composite structure of claim 1, adapted to separate oxygen from a gaseous mixture comprising oxygen.

5. The composite structure of claim 1, adapted to separate oxygen from a gaseous mixture comprising oxygen and react said oxygen.

6. The composite structure of claim 1, wherein the joint is hermetic to helium.

7. The composite structure of claim 1, wherein the composite structure is free of an interfacial phase.

8. The composite structure of claim 1, wherein the joint comprises an interfacial phase at least as resistant to oxidation and reduction as the first sintered body and the second sintered body.

* * * * *